United States Patent
Kenyon et al.

(10) Patent No.: US 12,020,186 B2
(45) Date of Patent: Jun. 25, 2024

(54) METHOD AND SYSTEM FOR INTELLIGENTLY MANAGING FACILITIES

(71) Applicant: Microsoft Technology Licensing, LLC, Redmond, WA (US)

(72) Inventors: Heidi Kenyon, Bellingham, WA (US); Choo Yei Chong, Redmond, WA (US); Megan Elizabeth Slater, Seattle, WA (US); Christopher Michael Dollar, Renton, WA (US); Wende Ellen Copfer, Woodinville, WA (US); Venkata Sreekanth Kannepalli, Redmond, WA (US); Shabnam Erfani, Kirkland, WA (US); Amy Lieh-An Huang, Seattle, WA (US); Neha Parikh Shah, Glen Ridge, NJ (US); Edward Michael Doran, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 61 days.

(21) Appl. No.: 17/707,779

(22) Filed: Mar. 29, 2022

(65) Prior Publication Data

US 2023/0186189 A1 Jun. 15, 2023

Related U.S. Application Data

(60) Provisional application No. 63/289,440, filed on Dec. 14, 2021.

(51) Int. Cl.
*G06Q 10/0631* (2023.01)
*G06N 5/04* (2023.01)
(Continued)

(52) U.S. Cl.
CPC .......... *G06Q 10/0631* (2013.01); *G06N 5/04* (2013.01); *G06N 20/00* (2019.01); *G06Q 10/1095* (2013.01)

(58) Field of Classification Search
CPC .......... G06Q 10/00–50/00; G06N 3/00–20/00
(Continued)

(56) References Cited

U.S. PATENT DOCUMENTS 8,965,967 B2  2/2015 Gilbert et al.
9,226,105 B2  12/2015 Turgman et al.
(Continued)

FOREIGN PATENT DOCUMENTS

EP  3847600 A1  7/2021

OTHER PUBLICATIONS

"What is Meeting Room Booking Software & How to Implement It?", Retrieved From: https://www.workinsync.io/what-is-meeting-room-booking-software-and-how-to-implement-it/#content-1, Oct. 4, 2021, 8 Pages.
(Continued)

*Primary Examiner* — Alan S Miller
(74) *Attorney, Agent, or Firm* — NovoTechIP International PLLC

(57) ABSTRACT

A system and method for managing one or more physical spaces includes receiving data relating to location of a plurality of users, determining based on the location, an occupancy rate of the plurality of users for at least one of the one or more physical spaces, identifying based on the occupancy rate and features provided at the one or more physical spaces, one or more user preferred features, providing the occupancy rate and the user preferred features to a trained machine-learning (ML) model for determining optimal uses for the one or more physical spaces in a future time period, receiving as an output from the trained ML
(Continued)

model suggested plans for use or management of the one or more physical spaces in the future time period, and providing the suggested plans for display in a user interface (UI) screen.

20 Claims, 8 Drawing Sheets

(51) Int. Cl.
  *G06N 20/00* (2019.01)
  *G06Q 10/1093* (2023.01)
(58) Field of Classification Search
  USPC .............................................. 705/7.11–7.42
  See application file for complete search history.

(56) References Cited

U.S. PATENT DOCUMENTS

| | | | |
|---|---|---|---|
| 9,955,318 B1* | 4/2018 | Scheper | G06Q 10/02 |
| 10,361,981 B2 | 7/2019 | Bennett et al. | |
| 10,510,026 B1 | 12/2019 | Adamson et al. | |
| 10,845,791 B2* | 11/2020 | Cohen | G05B 15/02 |
| 10,922,663 B2 | 2/2021 | Chittaluru et al. | |
| 10,985,938 B2 | 4/2021 | Krasadakis | |
| 11,138,862 B2 | 10/2021 | Vanblon et al. | |
| 11,164,159 B2* | 11/2021 | Ma | G07C 9/22 |
| 11,587,210 B1 | 2/2023 | Chen et al. | |
| 2006/0161447 A1* | 7/2006 | O'Hollearn | G06Q 10/105 |
| | | | 705/320 |
| 2009/0055270 A1 | 2/2009 | Magdon-ismail et al. | |
| 2009/0193217 A1* | 7/2009 | Korecki | G06Q 10/087 |
| | | | 711/170 |
| 2010/0287011 A1 | 11/2010 | Muchkaev | |
| 2011/0106573 A1 | 5/2011 | Mcnamara | |
| 2011/0112875 A1* | 5/2011 | Johnson | G06Q 10/063 |
| | | | 705/7.11 |
| 2012/0290336 A1* | 11/2012 | Rosenblatt | H04B 5/00 |
| | | | 705/5 |
| 2014/0058778 A1 | 2/2014 | Mclarty et al. | |
| 2014/0059130 A1 | 2/2014 | Sheinfeld | |
| 2015/0193819 A1* | 7/2015 | Chang | G06Q 30/0252 |
| | | | 705/7.19 |
| 2017/0017928 A1 | 1/2017 | Miller et al. | |
| 2017/0249714 A1 | 8/2017 | Van Hoof et al. | |
| 2017/0293851 A1 | 10/2017 | Chawla et al. | |
| 2017/0308866 A1 | 10/2017 | Dotan-cohen et al. | |
| 2017/0357904 A1 | 12/2017 | Adler et al. | |
| 2017/0357951 A1 | 12/2017 | Patel et al. | |
| 2018/0109574 A1 | 4/2018 | Vigoda et al. | |
| 2018/0114177 A1 | 4/2018 | Somech et al. | |
| 2018/0115170 A1 | 4/2018 | Bacarella et al. | |
| 2018/0218734 A1 | 8/2018 | Somech et al. | |
| 2018/0268337 A1 | 9/2018 | Miller et al. | |
| 2018/0285827 A1 | 10/2018 | Dotan-cohen et al. | |
| 2018/0374004 A1 | 12/2018 | Eone et al. | |
| 2019/0130367 A1 | 5/2019 | Pell et al. | |
| 2019/0138653 A1* | 5/2019 | Roller | G06F 40/35 |
| 2019/0318032 A1 | 10/2019 | Vangala et al. | |
| 2019/0340554 A1 | 11/2019 | Dotan-cohen et al. | |
| 2020/0110519 A1 | 4/2020 | Vangala et al. | |
| 2020/0110623 A1 | 4/2020 | Vangala et al. | |
| 2020/0118045 A1 | 4/2020 | Chung et al. | |
| 2020/0213006 A1 | 7/2020 | Graham et al. | |
| 2020/0234523 A1* | 7/2020 | Ma | G08G 1/149 |
| 2020/0274726 A1 | 8/2020 | Setteboun et al. | |
| 2020/0287736 A1 | 9/2020 | Zhuk et al. | |
| 2020/0311635 A1 | 10/2020 | Emig et al. | |
| 2020/0334642 A1 | 10/2020 | Vaananen | |
| 2020/0401661 A1 | 12/2020 | Kota et al. | |
| 2021/0209562 A1 | 7/2021 | Lange et al. | |
| 2021/0224754 A1* | 7/2021 | Zarakas | G06N 3/08 |
| 2021/0256084 A1 | 8/2021 | Marsh et al. | |
| 2021/0319408 A1 | 10/2021 | Jorasch et al. | |
| 2021/0406840 A1 | 12/2021 | Deluca | |
| 2022/0005275 A1 | 1/2022 | Atlas et al. | |
| 2022/0014571 A1 | 1/2022 | Polish et al. | |
| 2023/0186247 A1 | 6/2023 | Kenyon et al. | |
| 2023/0186248 A1 | 6/2023 | Kenyon et al. | |

OTHER PUBLICATIONS

"CoWrks Launches 'Converge'—India's First Ever Sophisticated Solution for Business Gatherings and Events", Retrieved From: https://www.prnewswire.com/in/news-releases/cowrks-launches-converge-india-s-first-ever-sophisticated-solution-for-business-gatherings-and-events-866363895.html, Mar. 29, 2019, 02 Pages.
"Non-Final Office Action Issued in U.S. Appl. No. 17/707,710", dated Oct. 4, 2023, 14 Pages.
"Non Final Office Action Issued in U.S. Appl. No. 17/707,641", dated Oct. 24, 2023, 35 Pages.
Ashbrook, et al., "Learning Significant Locations and Predicting User Movement with GPS", In Proceedings of Sixth International Symposium on Wearable Computers, Oct. 10, 2022, 8 Pages.
US-2023-0186247-A1, Jun. 15, 2023.
"International Search Report and Written Opinion Issued in PCT Application No. PCT/US22/044055", dated Nov. 25, 2022, 15 Pages.
"International Search Report and Written Opinion Issued in PCT Application No. PCT/US22/044953", dated Nov. 28, 2022, 18 Pages.
"International Search Report and Written Opinion Issued in PCT Application No. PCT/US22/046346", dated Nov. 28, 2022, 15 Pages.
U.S. Appl. No. 17/707,641, filed Mar. 29, 2022.
U.S. Appl. No. 17/707,710, filed Mar. 29, 2022.
Aliannejadi, et al., "Personalized ranking for context-aware venue suggestion." Proceedings of the Symposium on Applied Computing, pp. 960-962.
Final Office Action mailed on Mar. 18, 2024, in U.S. Appl. No. 17/707,641, 44 pages.
Final Office Action mailed on Apr. 8, 2024, in U.S. Appl. No. 17/707,710, 11 pages.

* cited by examiner

METHOD AND SYSTEM FOR INTELLIGENTLY MANAGING FACILITIES

CROSS-REFERENCE TO A RELATED APPLICATION

This patent application claims the benefit of priority to U.S. Provisional Application No. 63/289,440 entitled "Method and System for Facilitating Convergence," filed on Dec. 14, 2021, the entirety of which is incorporated herein by reference.

BACKGROUND

With recent changes in work environments where many companies offer flexibility to employees on where to work from, the use of office space has changed drastically in recent times. In the past, most employees were provided with an assigned workspace (e.g., cubicle or office) that would be for their exclusive use. However, with many employees choosing to work remotely at least some of the time, providing assigned workspaces results in a lot of vacant spaces. Having vacant or rarely used office spaces, however, is a significant and unnecessary expense. Yet even employees that work remotely often need to visit the companies' office facilities and/or sometimes work from those facilities. Determining how to assign office space to such employees in an efficient manner that provides employee flexibility and optimizes facility use is a challenging task.

Furthermore, management, maintenance and/or developing future plans for facilities in this changing and flexible employee environment is a very challenging and complex task. For example, not all facilities and/or facility features offered by a company may have the same level of popularity with employees. In an example, for a company having various buildings in different geographical locations of a city, some of those buildings may be closer or otherwise more preferable to a majority of the company's employees. Identifying such preferences, however, often requires conducting surveys and performing extensive analyses which are frequently time consuming and costly.

Hence, there is a need for improved systems and methods of intelligently managing, maintaining and/or developing plans for one or more facilities.

SUMMARY

In one general aspect, the instant disclosure presents a data processing system having a processor and a memory in communication with the processor wherein the memory stores executable instructions that, when executed by the processor, cause the data processing system to perform multiple functions. The function may include receiving data relating to location of a plurality of users, determining based on the location, an occupancy rate of the plurality of users for at least one of the one or more physical spaces, identifying based on the occupancy rate and features provided at the one or more physical spaces, one or more user preferred features, providing the occupancy rate and the user preferred features to a trained machine-learning (ML) model for determining optimal uses for the one or more physical spaces in a future time period, receiving as an output from the trained ML model suggested plans for use or management of the one or more physical spaces in the future time period, and providing the suggested plans for display in a user interface (UI) screen.

In yet another general aspect, the instant disclosure presents a method for facilitating convergence. In some implementations, the method includes receiving data relating to location of a plurality of users, determining based on the location, an occupancy rate of the plurality of users for at least one of the one or more physical spaces, identifying based on the occupancy rate and features provided at the one or more physical spaces, one or more user preferred features, providing the occupancy rate and the user preferred features to a trained ML model for determining optimal uses for the one or more physical spaces in a future time period, receiving as an output from the trained ML model suggested plans for use or management of the one or more physical spaces in the future time period, and providing the suggested plans for display in a UI screen.

In a further general aspect, the instant application describes a non-transitory computer readable medium on which are stored instructions that when executed cause a programmable device to perform functions of receiving data relating to location of a plurality of users, determining based on the location, an occupancy rate of the plurality of users for at least one of the one or more physical spaces, identifying based on the occupancy rate and features provided at the one or more physical spaces, one or more user preferred features, providing the occupancy rate and the user preferred features to a trained ML model for determining optimal uses for the one or more physical spaces in a future time period, receiving as an output from the trained ML model suggested plans for use or management of the one or more physical spaces in the future time period, and providing the suggested plans for display in a UI screen.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1A:
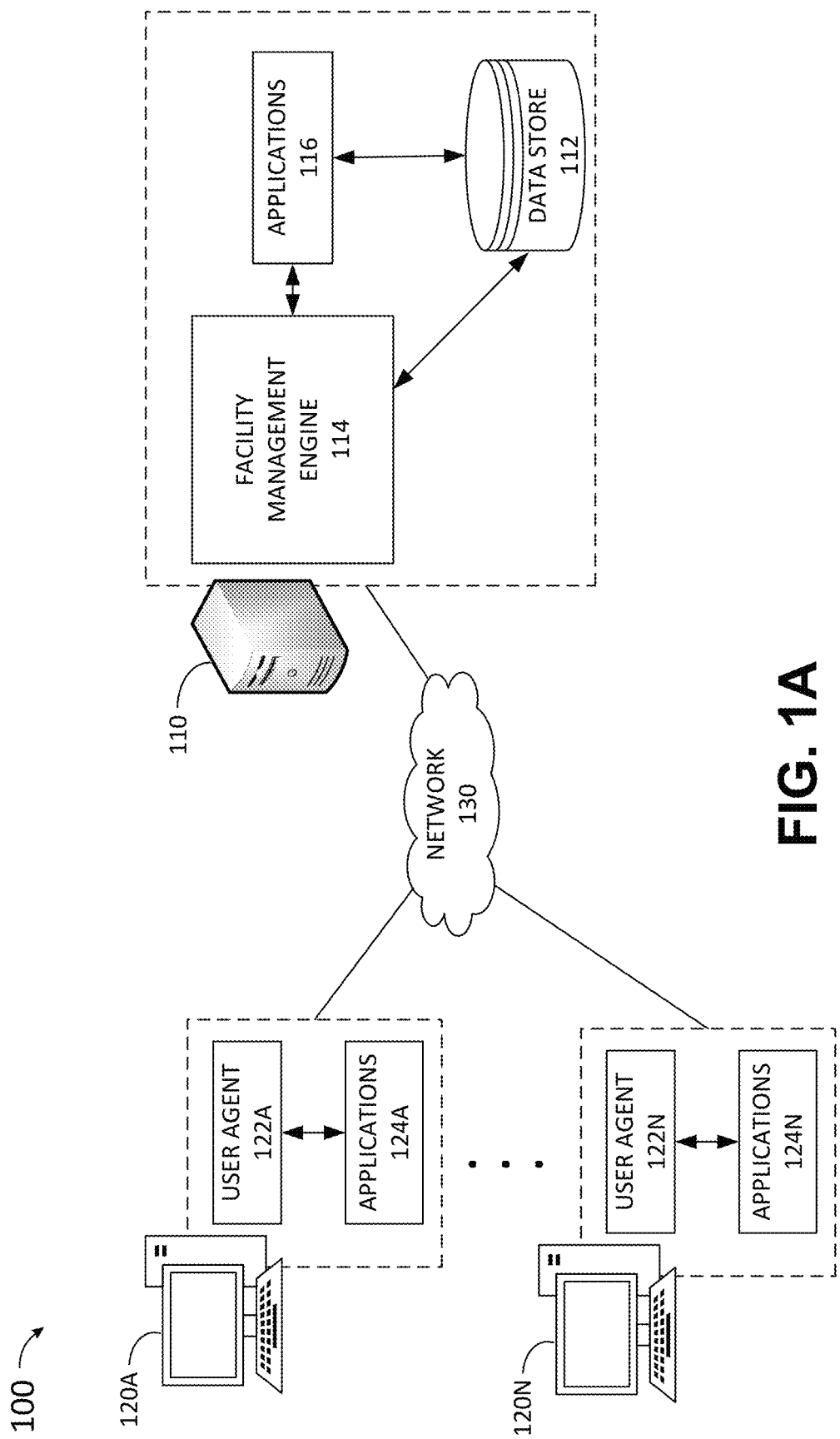
FIG. 1A depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

With the rapid change in work environments in recent years, many enterprises are finding that their previous work facilities are not efficient, are not being used effectively or require maintenance, optimization and/or more efficient management. This is because previously, an organization would often assign a specific location at a facility to each employee and would expect the employee to spend the majority of their working hours at that particular location. In this manner, the organization would know how and by whom each facility is being used. With the flexibility provided to work from various locations, however, many organizations are finding that a large portion of their facilities are not being used efficiently. Furthermore, because of flexible hours and flexible work locations, many organizations do not have active knowledge of how their facilities are being used. As a result, determining how and when facilities are used is often difficult and requires extensive data collection and human analysis. As such, there exists a technical problem of lack of mechanisms for efficiently determining actual usage information of facilities.

Furthermore, not all facilities and/or facility features have the same level of use and/or user popularity. For example, offering free coffee and snacks may be very popular with employees of one organization while the same may not be true for employees of another company. As a result, an organization may be offering benefits that are not being used efficiently by their employees. Identifying popular facility features and/or benefits, however, requires extensive data collection and careful analysis. This often requires human input and is thus costly and error prone. As such, there exists a technical problem of lack of mechanisms for efficiently and accurately identifying and offering user preferred features.

To address these technical problems and more, in an example, this description provides technical solutions for automatically determining occupancy rates of one or more physical spaces, intelligently identifying user preferred features based at least in part on occupancy rates and/or other parameters, and automatically determining optimal uses for the one or more physical spaces based on at least one of the occupancy rates, the user preferred features and/or other parameters. This may involve collecting and analyzing user location history and/or user location prediction data to automatically determine occupancy rates for the physical spaces. Furthermore, the technical solution may involve collecting and analyzing facility feature data and facility use data to identifying user preferred features. Making these determinations may involve the use of one or more ML models.

The technical solutions described herein address the technical problem of inefficiencies and difficulties in managing, maintaining and/or developing plans for optimal uses of facilities and/or features offered by those facilities by providing a system and method for automatically determining occupancy rates and/or automatically identifying user preferred features. The technical solutions provide for use of user location history and/or user location prediction data to enable an organization to allocate, optimize and/or manage facilities and resources based on actual usage information gathered through the convergence tools disclosed herein. The usage information may include data on the number of users who use a facility on a given date and/or a given time (e.g., on Wednesday mornings) to enable automatic ordering, repairing, improving and expanding of services, products and/or facilities. The technical effects at least include (1) improving the efficiency of using a physical space used by a plurality of users; (2) optimizing facility use by automatically determining and/or predicting facility occupancy rates; (3) optimizing the process of facility and facility feature management by automatically identifying user preferred features; (4) providing user interface (UI) elements that increase user efficiency and user satisfaction by enabling the user to view current or predicted occupancy rates; and (5) providing UI elements that increase user efficiency in optimizing and/or managing facilities and resources.

As will be understood by persons of skill in the art upon reading this disclosure, benefits and advantages provided by such implementations can include, but are not limited to a technical solution to the technical problems of lack of adequate mechanisms for efficiently and automatically managing, maintaining and/or developing plans for use of facilities. The benefits made available by these technology-based solutions provide automated, user-friendly and efficient mechanisms for management, maintenance and/or development of future plans for facilities.

As used herein, the term "facility" may refer to a physical location (e.g., office building, conference room, outdoor space) that can be occupied by and/or be used by multiple users. The term "physical space" may refer to a facility or a space within a facility that may be used by one or more users. Examples of physical spaces include an office, cubicle, desk space, and conference room. The term "feature" or "resource" may refer to a benefit, service or advantage offer by a facility or physical space. Examples of features or resources include refreshments, drinks, Wi-Fi, exercise equipment, child-care services, parking, in-house restaurants, and dry-cleaning services.

FIG. 1A illustrates an example system 100, upon which aspects of this disclosure may be implemented. The system 100 may include a server 110 which may be connected to or include a data store 112 which may function as a repository in which data sets relating to training models, user data, communications data, facility data, resource data, location data and the like may be stored. Although shown as a single data store, the data store 112 may be representative of multiple storage devices and data stores which may be connected to each of the various elements of the system 100. Furthermore, although the data store 112 is shown as being part of the server 110, one or more elements (e.g., storage mediums) of the data store 112 may be provided in separate storage servers or other types of servers. Moreover, the server 110 may include a plurality of servers that work together to deliver the functions and services provided by each service or application. Server 110 may operate as a shared resource server located at an enterprise which is accessible and/or may access data collected from various computer client devices such as client devices 120A-120N.

The server 110 may also operate as a cloud-based server for offering facility management services in one or more applications such as applications 116 and/or applications 124A-124N.

The server 110 may include and/or execute a facility management engine 114 which may provide facility management services for users utilizing an application that provides facility management capabilities on their client devices such as client device 120A-120N. The facility management engine 114 may operate to identify or predict users' locations, determining facility occupancy rates, identify user preferred features, and/or automatically determine plans for optimizing use of facilities. These determinations may be made based on various parameters including history of user locations, user data (e.g., organizational graph data), and/or facility data. The facility management engine 114 may also provide mechanisms for viewing occupancy rates of a facility and/or physical space, reserving a facility and/or physical space, determining status of resources, and/or ordering resources via one or more applications such as applications 116 or applications 124. The facility management engine 114 may include one or more separate elements that perform each of the functions of location prediction/identification, occupancy rate determination, and/or user preference identification, and/or facility management as further discussed below with respect to FIG. 1B.

Each of the client devices 120A-120N may be connected to the server 110 via a network 130. The network 130 may be a wired or wireless network(s) or a combination of wired and wireless networks that connect one or more elements of the system 100. The client devices 120A-120N may be personal or handheld computing device having or being connected to input/output elements that enable a user to interact with various applications (e.g., applications 116 or applications 124A-124N). Examples of suitable client devices 120A-120N include but are not limited to personal computers, desktop computers, laptop computers, mobile telephones, smart phones, tablets, phablets, smart watches, wearable computers, gaming devices/computers, televisions, and the like. The internal hardware structure of a client device is discussed in greater detail in regard to FIGS. 5 and 6.

In some implementations, each of the client devices 120A-120N is associated with a different user. One or more of the client devices 120A-120N may include one or more applications 124A-124N. Each application 124A-124N may be a computer program executed on the client device that configures the device to be responsive to user input to allow a user to use facility management tools such as viewing occupancy rates of a facility and/or physical space, reserving a facility and/or physical space, determining status of resources offered by a facility, and/or ordering resources. In some implementations, the applications 124A-124N include a local facility management engine for providing some local facility management services.

In some examples, applications used for providing facility management services are executed on the server 110 (e.g., applications 116) and are provided via an online service. In some implementations, web applications communicate via the network 130 with a user agent 122A-122N, such as a browser, executing on the client device 120A-120N. The user agent 122A-122N may provide a user interface (UI) that allows the user to interact with applications 116 and may enable applications 116 to provide data to the facility management engine 114 for processing. In some implementations, the facility management engine 114 is included in the applications 116.

Figure 1B:
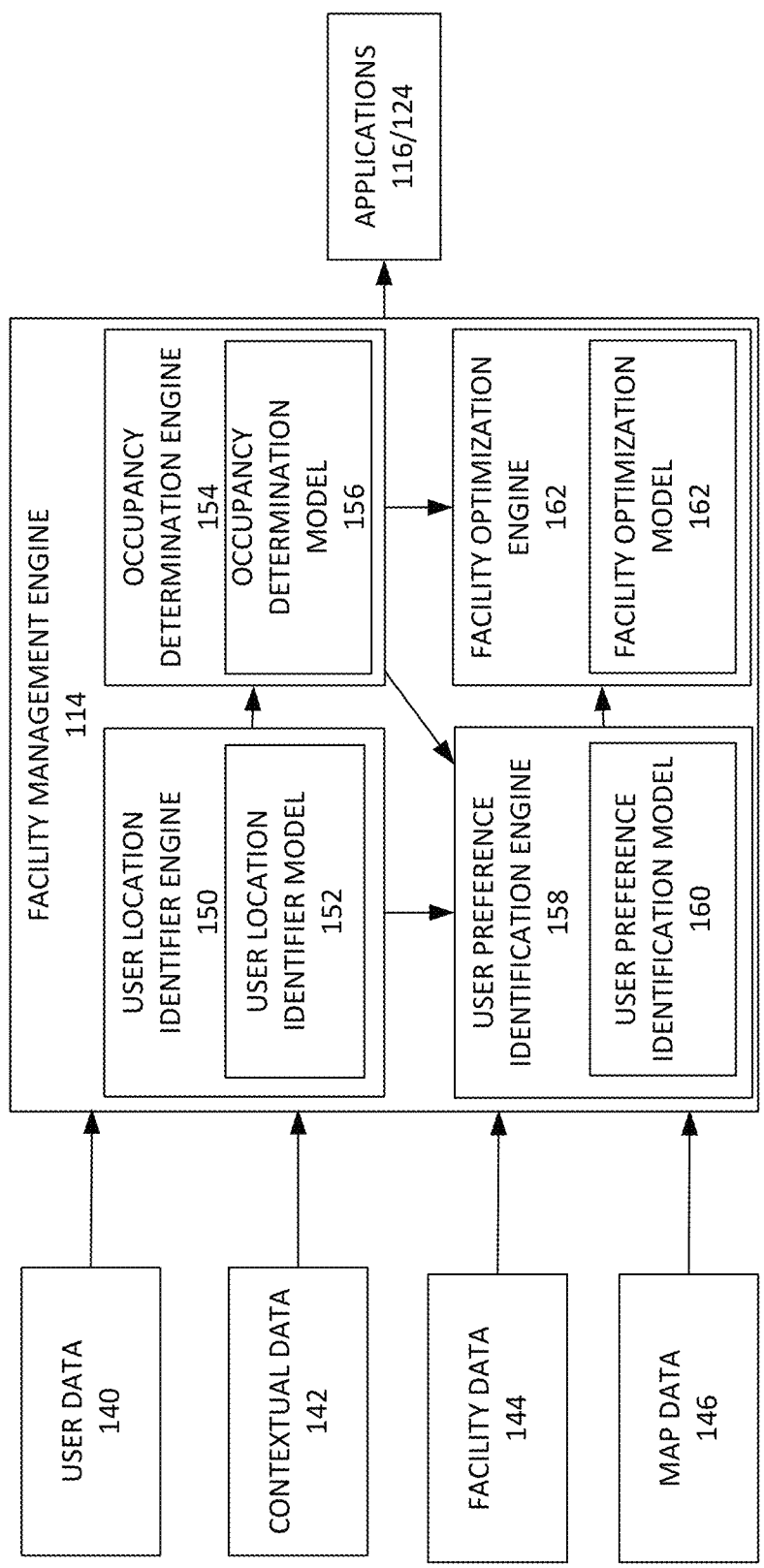
FIG. 1B depicts an example data flow between some elements of an example system upon which aspects of this disclosure may be implemented.

FIG. 1B depicts an example data flow between some of the elements of the example system 100. In some implementations, the facility management engine 114 receives user data 140, contextual data 142, facility data 144 and/or map data 146. The data may be received from a data storage medium that stores data such as the data store 112. The user data 140 may include current location and/or user history data such as location history data (e.g., the location at which the user works from each day of the week). Location data may be collected or inferred from a user's Internet Protocol (IP) address, GPS data, data relating to pinging a user's mobile device, network connection data (e.g., connection to a Wi-Fi in a building), health check data (e.g., when the user completes their health check at a specific building), and external data sources such as toll road data or public transportation data (e.g., train or bus tickets purchased). Location data may also be inferred from voice analysis conducted during a virtual meeting. For example, voice analysis may be performed to determine whether a user is in a conference room with other users or the user is attending a meeting remotely. Furthermore, location information may be inferred from organizational security data such as when the user uses a badge to enter a facility. It should be noted that in collecting and retrieving a user's geographical or other private data, care is taken to ensure all privacy guidelines and regulations are followed. For example, receiving a user's consent for collection, retrieval, storage and use of their data may be required.

In addition to location information, user data 140 may include user-provided preferences such as dietary restrictions, food preferences, types of venues preferred (e.g., indoor, outdoor, small venue, large venue, quiet venue), preferred mode of transportation (e.g., car, train, bus, etc.), accessibility limitations (e.g., wheelchair accessible, ADA accessible), whether they prefer to carpool or drive by themselves, and/or a number of other user preferences and/or requirements. This information may be provided directly by the user or may be inferred from other data, as discussed in detail below.

User data 140 may also include calendar data and communications data such as data relating to messages (e.g., email, instant messages, text messages), data relating to calls, video calls and the like. The calendar and communications data may provide information about the user's possible location. For example, calendar data may indicate that the user is in a particular facility at a given time. This information may also be retrieved and/or inferred from communications data (e.g., from emails, instant messages, and the like). User data 140 may include data for one or more of the users of a facility and/or employees of a company. In some implementations, user data 140 includes data for each employee or user who has consent to the use of their data.

Contextual data 142 may include organizational graph data relating employees of an organization and/or users of a facility. For example, contextual data 142 may include data about employee roles, employee city of residence, employee preferred office location, as well as data relating to relationships between different users (e.g., a first employee is the boss of a second employee). Facility data 144 may include data collected from smart building features such as light sensors, building temperatures (e.g., when a room's temperature is changed by a user, that indicates that a user is in the room), use of a smart speaker in a room, use of a TV or other audio/video equipment, and/or use of appliances (e.g., coffee machine). Moreover, facility data may be collected from reservation systems. For example, organizations that enable their employees to reserve a space (e.g., workspace or conference room) may collect the reservation information, along with data about the person who made the reservation and/or a list of persons that will be at the reserved space. This information can be used to determine a user's location both in the past and in the future and/or identify the user's preferred features. Facility data 144 may also include data about features or resources offered by a facility or physical space (e.g., refreshments or services), data about the status of resources offered (e.g., a smart coffee machine may provide data on the amount of coffee remaining in the coffee machine) and/or data about services used by employees (e.g., the amount of time an exercise equipment is in use).

The map data 146 may include data related to geographical locations of users, routes from and to one or more of the geographical locations to one or more facilities, directions, route information, traffic information and the like. The map data 146 may be used to calculate distances between various locations to predict facility occupancy rate and/or to facilitate development of plans for future facilities. The map data 146 may be retrieved from sources that provide map related information. In some implementations, this information is provided via an application programming interface (API) that offers access to a map application.

Once the required user data 140, contextual data 142, facility data 144 and/or map data 146 have been received or retrieved by the facility management engine 114, some or all of the received data may be provided to a user location identifier engine 150 for identifying a user's location. This may include identifying a user's current location and/or predicting the user's future location. When location information is available from a user's calendar or from a reservation system (e.g., the user has a meeting scheduled at a specific location or has reserved a space at a specific time), the user location identifier engine 150 may use the information to predict the user's location. When, however, location information is not directly available, the user location identifier engine 150 may intelligently determine the user's current or future location using the user data 140 (e.g., current or past location data), contextual data 142, facility data 144 and/or map data 146. This may involve use of one or more ML models, such as the user location identifier model 152, for predicting the user's location based on past behavior and/or patterns in user behavior.

As a general matter, the methods and systems described herein may include, or otherwise make use of an ML model to, analyze various parameters relating to user location, user associations, user preferences and/or facility usage. ML generally involves various algorithms that can automatically learn over time. The foundation of these algorithms is generally built on mathematics and statistics that can be employed to predict events, classify entities, diagnose problems, and model function approximations. As an example, a system can be trained using data generated by a ML model in order to identify patterns in user activity, determine associations between various users and/or user actions, predict user locations, identify user preferences and the like. Such training may be made following the accumulation, review, and/or analysis of data (e.g., user data and facility data) over time. Such data is configured to provide the ML algorithm (MLA) with an initial or ongoing training set. In addition, in some implementations, a user device can be configured to transmit data captured locally during use of relevant application(s) to a local or remote ML algorithm and provide supplemental training data that can serve to fine-tune or increase the effectiveness of the MLA. The supplemental data can also be used to improve the training set for future application versions or updates to the current application.

In different implementations, a training system may be used that includes an initial ML model (which may be referred to as an "ML model trainer") configured to generate a subsequently trained ML model from training data obtained from a training data repository or from device-generated data. The generation of both the initial and subsequent trained ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying MLAs, such as, but not limited to, decision trees, random decision forests, neural networks, deep learning (for example, convolutional neural networks), support vector machines, regression (for example, support vector regression, Bayesian linear regression, or Gaussian process regression) may be trained. As another example, size or complexity of a model may be varied between different ML models, such as a maximum depth for decision trees, or a number and/or size of hidden layers in a convolutional neural network. Moreover, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be continually updated, and one or more of the ML models used by the system can be revised or regenerated to reflect the updates to the training data. Over time, the training system (whether stored remotely, locally, or both) can be configured to receive and accumulate more training data items, thereby increasing the amount and variety of training data available for ML model training, resulting in increased accuracy, effectiveness, and robustness of trained ML models.

In collecting, storing, using and/or displaying any user data used in training ML models, care may be taken to comply with privacy guidelines and regulations. For example, options may be provided to seek consent (e.g., opt-in) from users for collection and use of user data, to enable users to opt-out of data collection, and/or to allow users to view and/or correct collected data.

The user location identifier model 152 may receive the user data 140, contextual data 142, facility data 144 and/or map data 146 as inputs and analyze the data to determine or predict one or more users' current or future locations based on patterns in user behavior and/or other parameters. For example, the user location identifier model 152 may examine user data 140 and facility data 144 to determine that a user often works from a specific office building on Tuesday mornings. Based on this information, the user location identifier model 152 may predict that the user will be located at that office building next Tuesday morning. This information may then be provided to the occupancy rate determination engine 154 and/or user preference determination engine 158 to determine occupancy rates and/or identify user preferences, as further discussed below.

In some implementations, the user data 140, facility data 144 and/or user location data is provided to an occupancy determination engine 154 as inputs. The occupancy determination engine 158 may analyze the received data to determine occupancy rates at given times for one or more facilities and/or physical spaces. For facilities that utilize a reservation system, the occupancy determination engine 158 may use data from reservation system to determine occupancy rates. This may involve examining the spaces reserved at a facility and compare that to the total number of available spaces to calculate an occupancy percentage for the facility. This may be calculated per building, per floor (e.g., second floor of building A will be 65% occupied on Monday), and/or per venue (e.g., a given restaurant will be 94% percent occupied on Friday night). For facilities that do not utilize a reservation system and/or when the reservation information is not up to date or the occupancy rate is being determined for a time that is too far in the future (e.g., reservations have not yet been made for the examined time period), the occupancy determination engine 154 may utilize history data of past occupancy rates and/or user location data to predict an occupancy rate at the examined time period. For example, the occupancy determination engine 154 may examine history of occupancy rates on Monday mornings for a given office building, determine a pattern in occupancy rates on Monday mornings and predict that the same occupancy rate will occur on a Monday morning in the future. This determination may be made by using one or more ML models such as the occupancy determination model 156.

Furthermore, the occupancy determination engine 154 may examine user location information (e.g., determined or predicted locations) to predict the occupancy rates of one or more facilities. For example, based on calendar information and/or predicted user location information received from user data 140 or user location identifier engine 150, the occupancy determination engine 154 may determine that 35 users will be present at a given office building next Wednesday afternoon. The predicted or calculated occupancy rate may be provided as an output to the user preference identification engine 158 and/or to the applications 116/124 for display to a user. In an example, the occupancy rates may be displayed in a UI screen of a reservation system to notify the users of occupancy rates at a facility they plan to visit. For example, the user may enter a date and time for their desired visit to a given facility and the UI screen may display a predicted occupancy rate for the facility at the desired time/date. In another example, the occupancy rate may be displayed in a UI screen of a facility management application to help a user (e.g., facility manager or administrator) examine patterns in occupancy rates, optimize facility use and/or develop future plans for facilities. For example, the occupancy rates may help an administrator determine repair, maintenance and other facility management needs. This may help an administrator determine repair, maintenance and other facility management needs. It may also assist the administrator determine if the building is being used efficiently. For example, when the facility management engine 152 predicts that a building will only be 10% occupied in the next year, the administrator may be able to convey this information to management to help decide whether the building should be divested. In another example, if occupancy rates show that a building is always full, a new building in the area may need to be acquired.

The user preference identification engine 158 may receive various inputs to identify user preferences in facilities, features and/or resources. In an example, the user preference identification engine 158 receives user data 140, contextual data 142, facility data 144, occupancy information data from the occupancy determination engine 154 and user location data from the user location identifier engine 150. The user preference identification engine 158 may examine the user data or facility data to determine if there are any explicit user preference data (e.g., multiple users have explicitly stated a preference for a specific building or specific facility features in their user profile or in a user survey). In addition to explicit user preferences, the user preference identification engine 158 may infer or predict user preferences. For example, the user preference identification engine 158 may examine the occupancy rates of multiple facilities, identify facilities that are regularly more occupied than others and examine the facility features and/or resources offered by those facilities to identify patterns in user preferences.

Furthermore, the user preference identification engine 158 may examine user location data (e.g., determined or predicted) to identify locations (e.g., facilities or physical spaces) of preference to users. This data may be used to collate information about and extrapolate conclusions from features that various popular gathering places have in common, such as free Wi-Fi, coffee, free parking, and the like. Based on this information and facility data information, the user preference identification engine 158 may be able to identify user preferences for specific locations, facility features and/or resources. For example, the user preference identification engine 158 may determine that a large number of employees work from a specific type of coffeeshop. Using this information, the user preference identification engine 158 may infer that these employees prefer the coffee brand offered by this coffeeshop. Identifying this preference may enable the employer to offer the same brand of coffee at their office buildings. In another example, the user preference identification engine 158 may determine that one of their office buildings has a regular occupancy rate of above 90% while another office building located at a different part of town has a below 50% occupancy rate. This information may lead the user preference identification engine 158 to identify a user preference for the location of the more occupied office building. This information may be taken into account by the enterprise in making future plans for facility development.

The user preference information identified by the user preference identification engine 158 may be provided to applications 116/124 for display to one or more users. In an example, the identified user preferences are displayed in a UI screen of a facility management application to help a user (e.g., facility manager or administrator) identify features and/or resources that are popular with users. This may enable an enterprise to eliminate features and/or resources that are not popular with employees and instead add features and/or resources that are preferrable. The identified user preferences may also assist an organization optimize facility use, improve and/or develop future plans for facilities.

Once occupancy rates have been determined and popular gathering places have been identified, information about popular gathering places may be provided to users so others are made of aware of places that are often occupied by their coworkers. In this manner, the convergence engine 114 may increase the possibility of serendipitous connections. In some implementations, notifications about popular gathering places are generated and displayed to users who have a connection with or who would likely benefit from a connection with the types of people gathering in a place. For example, if many of the user's team members work from a given coffeeshop the user has never worked from, this information may be provided to the user to enable them to visit the coffeeshop to meet with their team members. It should be noted that information about location is anonymized and/or consent is sought before location information is shared with an organization or employees of an organization.

In some implementations, the facility management engine 114 may enable conducting surveys about features important to employees in gathering places. Furthermore, the facility management engine 114 may enable receiving feedback about conference room or workspace experiences (e.g., via surveys). These capabilities may be provided via an administrator portal provided by the facility management engine 114. The administrator portal may be a UI screen that provides various mechanism for displaying reports about facilities, their use, different gathering places, occupancy rates during various times, and the like. For example, the administrator portal may provide reports on the number of workspaces reserved verses the number of people who were actually present at the workspace after making the reservation.

Moreover, the administrator portal may be linked to a reservation system for reserving rooms, workspaces, and the like in the company's facilities. The occupancy information collected or calculated may be used in the reservation system to help users determine the crowdedness of a space, which may assist them in deciding whether they wish to visit a building. Furthermore, the vacancy information or predicted status of rooms and buildings may help a user identify workspaces and/or conference rooms to reserve for future use. The facility management engine 114 may also enable an administrator to identify geographical locations convenient to or often used by employees for work. This may help building management to choose locations for future buildings. In some implementations, facility management is further achieved by enabling a user to reserve vacant spaces (e.g., workspace, office space, conference rooms, etc.) from the applications 116/124.

In some implementations, the administrator portal is used to upload a floorplan for a current or future building and make a request to the facility management engine 114 to design workspaces in the uploaded floorplan based on occupancy rates, desirable facility features, and the like. In another example, the administrator uploads photos of floorplans to the system and enables crowdsourcing for ideas on how to design workspaces and/or conference rooms. In yet another example, the facility management engine 114 retrieves data from existing cameras in facilities to automatically show past or current workspace views. Moreover, the facility management engine 114 may enable an organization to create and view reports on how tools provided by the facility management engine 114 have impacted the organization over a given time period. For example, the facility management engine 114 may make use of surveys and internal data to help the organization determine how use of the tools disclosed herein have affected the organization's ability to attract new talent, retain talent, increase revenue, increase sales, increase productivity and the like.

In some implementations, the identified user preferences, survey results and/or occupancy rates are provided as inputs to a facility optimization engine 162. The facility optimization engine 162 may examine the data to identify ways in which use of one or more facilities may be identified. For example, the facility optimization engine 162 may determine based on the occupancy rates that one of the facilities used by an enterprise is underutilized, while another building facility is normally crowded. This may lead the facility optimization engine 162 to examine ways in which the underutilized facility may be improved to encourage more use. For example, the facility optimization engine 162 may examine the identified user preferences to determine which features are not offered at the underutilized facility and make a recommendation for offering those features. In another example, the facility optimization engine 162 may determine that the identified user preferences are offered at the underutilized facility. This may lead to a determination that the location of the underutilized facility is not desirable. The facility optimization engine 162 may then provide a recommendation for not renewing a lease for the underutilized facility and instead acquiring a new building closer to the crowded facility. These determinations may be made by using one or more ML models such as the facility optimization model 162. In an example, facility data 144, occupancy data and identified user preferences data are provide to the facility optimization engine 162 as inputs and recommendations for optimizing the use of one or more facilities are received as outputs from the facility optimization engine 162. The recommendations may be provided to the applications 116/124 for display to a user.

In this manner, the facility management engine 114 may enable efficient and effective facility management, optimizing and development. This is made possible by being able to automatically determine user locations, automatically determine occupancy rates and/or automatically determine user preferred features that are offered by one or more facilities. In this manner, the technical solution increases facility efficiency, management efficiency and employee satisfaction.

Figure 2:
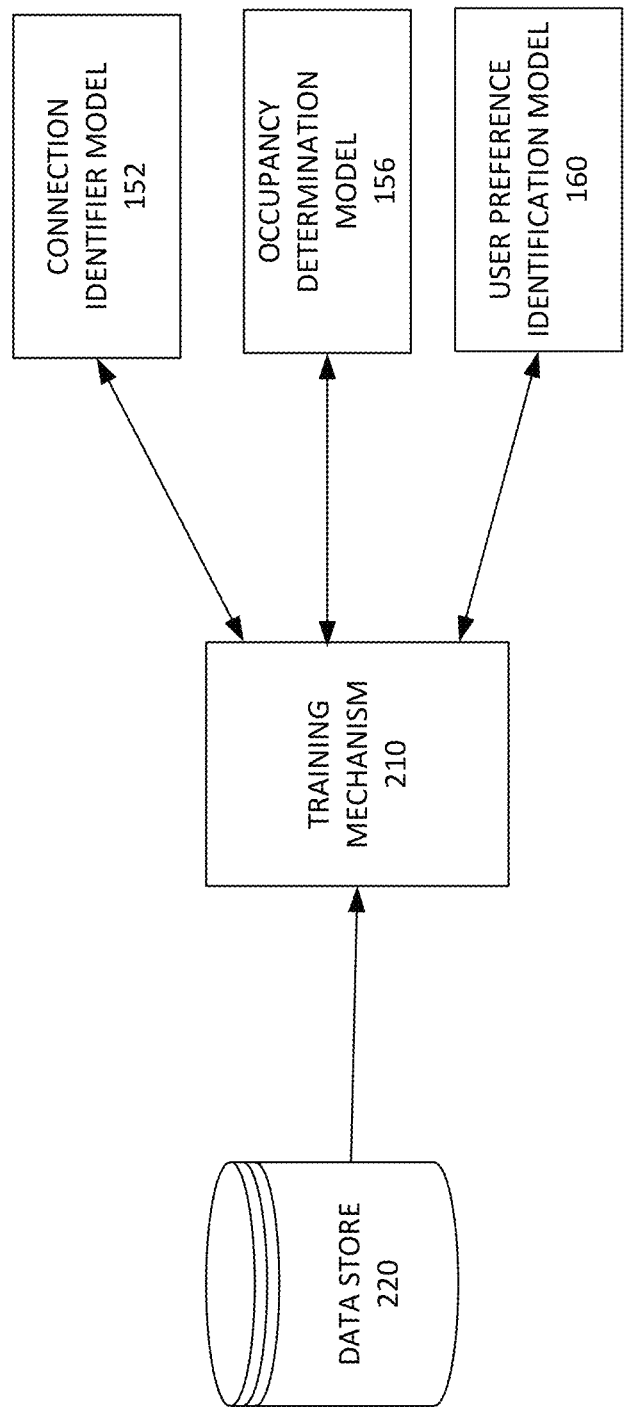
FIG. 2 depicts how one or more ML models used by a convergence engine may be trained.

FIG. 2 depicts how one or more ML models used by the facility management engine 114 may be trained by using the training mechanism 210. The training mechanism 210 may use labeled and/or unlabeled training data sets stored in the data store 220 to provide initial and ongoing training to the connection identifier model 152, occupancy determination model 156 and/or user preference identification model 160. In some implementations, the training mechanism 210 uses labeled training data to train one or more of the models via deep neural network(s) or other types of ML models. The initial training may be performed in an offline stage. Additionally, and/or alternatively, the one or more ML models may be trained using batch learning.

In some implementations, to provide ongoing training, the training mechanism 210 may use training data sets received from each of the ML models. Furthermore, data may be provided from the training mechanism 210 to the data store 220 to update one or more of the training datasets in order to provide updated and ongoing training. Additionally, the training mechanism 210 may receive training data such as knowledge from pre-trained mechanisms.

Figure 3A:
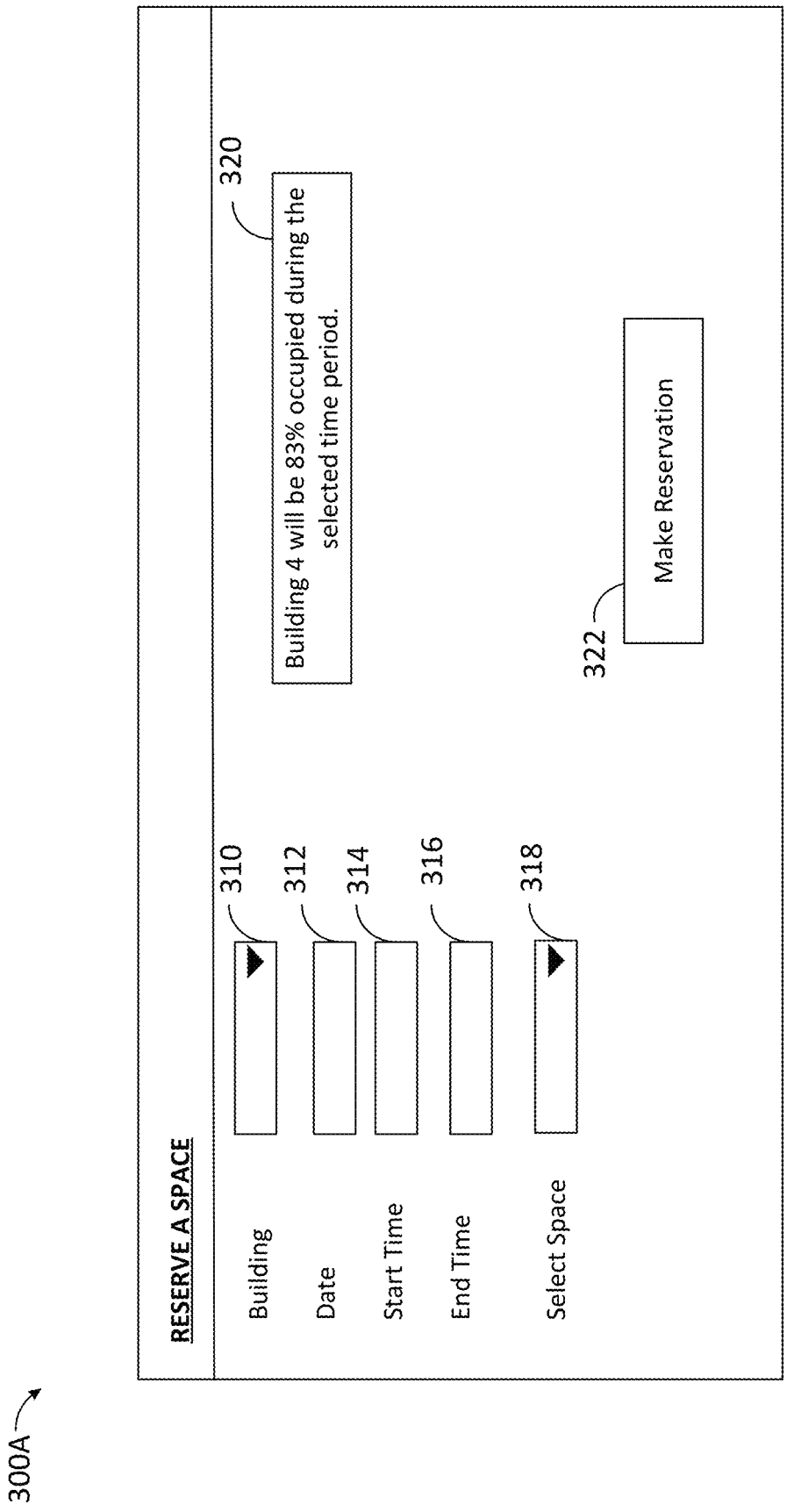
FIGS. 3A-3B depict example graphical user interface (GUI) screens of an application or service that facilitates convergence.
Figure 3B:
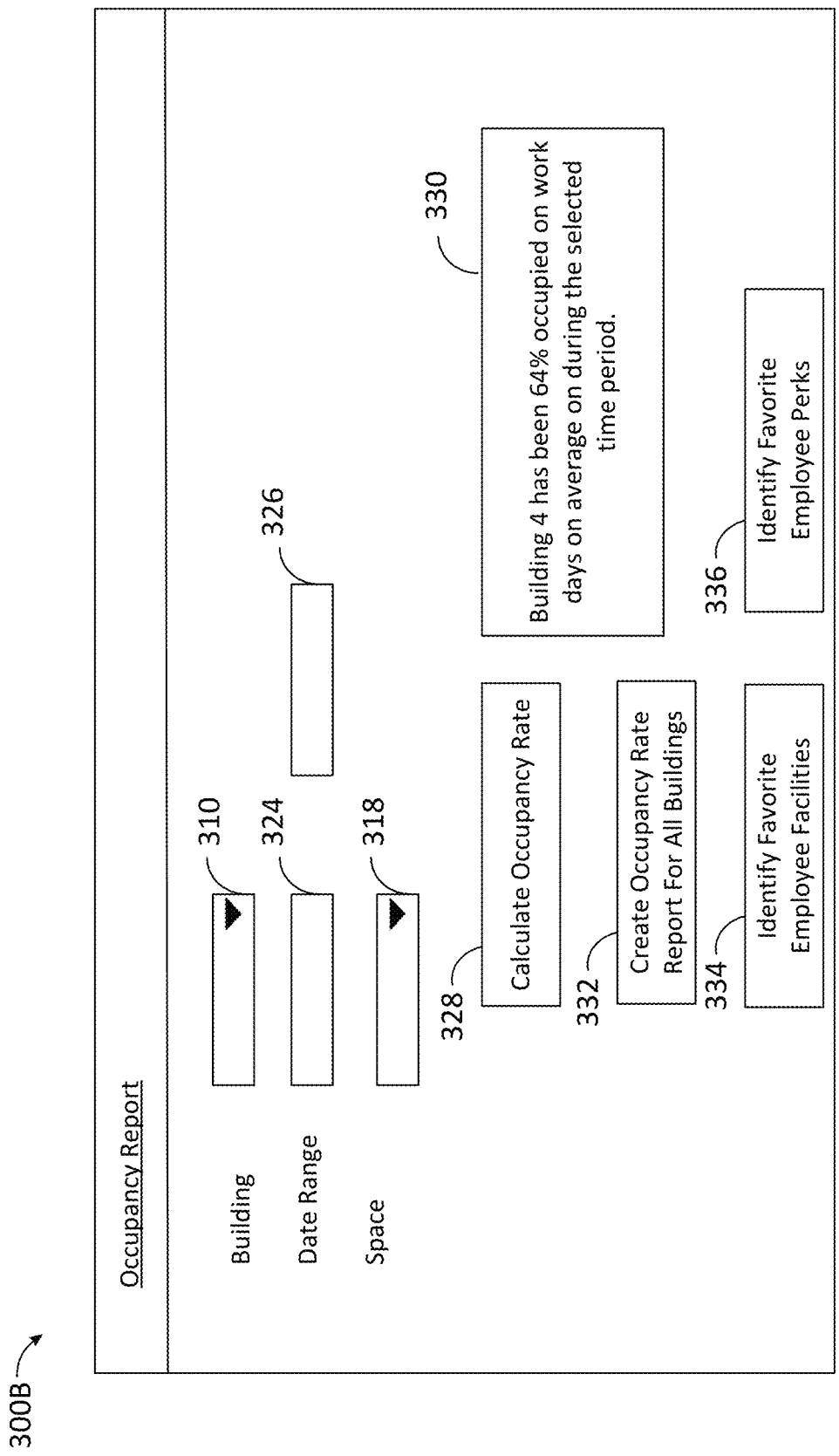

FIGS. 3A-3B depict example GUI screens of an application or service that provides facility management and/or facility reservation. FIG. 3A depicts an example GUI screen 300A of a facility reservation/management application that allows users to reserve a space within a given facility. In an example, such a reservation service may be provided by an enterprise that enables users (e.g., employees) to reserve a space such as an office or desk space at one or more facilities, when needed. For example, an enterprise may choose to provide a reservation system for employees to utilize when they choose to work from the office, instead of providing designated workspaces for each employee. In another example, an enterprise may provide a reservation system for remote employees to use for when they are visiting one of the enterprise's facilities. The reservation system may allow the users to select a facility, date/time, and/or a type of space to reserve, when needed. In this manner, the enterprise may be able to more efficiently utilize office space.

The GUI screen 300A may include a UI element 310 (e.g., a dropdown menu option) for selecting a desired building. This may be provided when more than one facility is available for reservation. Once a building is selected from the UI element 310, reservation information regarding the selected building may be retrieved. In one example, once a building is selected, an option is provided to view a map of the physical spaces (e.g., offices, desk spaces, cubicles, etc.) within the selected building. When a building includes multiple floors, another UI option may be provided for selecting a desired floor. Alternatively, the UI element 310 may display a separate selectable option for each floor of a building.

The GUI screen 300A may also a UI element 312 for choosing a date. In example, clicking on the UI element 312 results in the display of a calendar from which a date may be selected. In addition to selecting a date, the user may utilize UI elements 314 and 316 for selecting a start time/date and end time/date for the reservation. After the building and date/time are selected, a UI element 320 may be displayed to inform the user of the occupancy rate of the facility during the desired time. In an example, the UI element 320 is automatically displayed once the building and date/time are chosen. Alternatively, a menu option may be utilized to transmit a request for viewing the occupancy rate of the building during the desired date/time. The occupancy rate may be calculated based on the reservations made for the building on the desired date/time and/or based on historical data and/or predicted user locations. The UI element 320 may identify the building and display the predicted occupancy rate. This may enable the user to make an informed decision about their desire to visit the building. For example, if the user is concerned about crowds, a high occupancy rate may assist them in choosing a different building. In another example, if the user is interested in visiting with a large number of people when he/she is going to the office, a high occupancy rate may be desirable to them.

Once the date and time is selected, a UI element 318 may be utilized for selecting a space to reserve in the building. In an example, after the user selects the desired date/time for the reservation, the reservation system identifies spaces in the building that are available for reservation at the selected date/time. The available spaces may be viewed and/or selected by utilizing the dropdown menu 318. Alternatively or additionally, the available spaces may be identified by an indicator on a map of the building. In implementations that display a building map, the user may be able to select a space to reserve directly from the map. Once a selection has been made (e.g., via the UI element 318 and/or via the building map), the UI element 322 may be utilized to reserve the space.

FIG. 3B depicts an example GUI screen 300B of a facility management application that allows users to view a report of facility occupancy rates. In an example, screen 300B may be one of several portal pages displayed by a facility management application. Screen 300B may enable an admin to calculate occupancy rates for one or more facilities. The user may choose a building by utilizing the UI element 310 which may display a list of available buildings via the dropdown menu. The screen 300B may also include UI elements 324 and 326 for enabling the user to choose a date range for the occupancy calculation. Each of the UI elements 324 may display a scrollable calendar when selected, thus enabling the user to choose a start and end date for the date range.

Once the building and date range is selected, the UI element 328 may be utilized to calculate the occupancy rate for the selected building during the selected date range. In an example, once the UI element 328 is initiated, a UI element (e.g., pop-up menu) such as the UI element 330 is displayed to present the calculated occupancy rate. The UI element 330 may identify the selected building and display the calculated average occupancy rate for the building. In some examples, in addition to calculating occupancy rates for each facility, opponency rates may also be calculated for one or more physical spaces (e.g., conference rooms, offices, etc.) within a building. In such implementations, the UI element 318 may be utilized to select a specific space for calculating the occupancy rate. Moreover, the UI element 332 may be utilized to calculate the occupancy rate for more than one building. In an example, the UI element 332 can be used to calculate the occupancy rate during the selected date range for all of the buildings for an enterprise. This may result in the display of an occupancy report that presents the occupancy rates of multiple buildings. This can enable an administrator to quickly and efficiently determine and compare facility use rates.

In some implementations, the facility management application enables an administrator to view favorite employee facilities and/or perks. This may be achieved by utilizing the UI elements 334 and 336. Selecting the UI element 334 may result in the display of a pop-up menu or other UI element that displays a list of one or more facilities and/or spaces that are most frequently used by the employees. The list may include one or more enterprise facilities and/or other locations (e.g., coffeeshops, restaurants, libraries, etc.) that are frequently used by a large number of employees. In an example, the displayed list also presents the occupancy rates for the favorite facilities. Selecting the UI element 336 may result in the display of one or more employee perks that are frequently used and/or are favored by employees.

Figure 4:
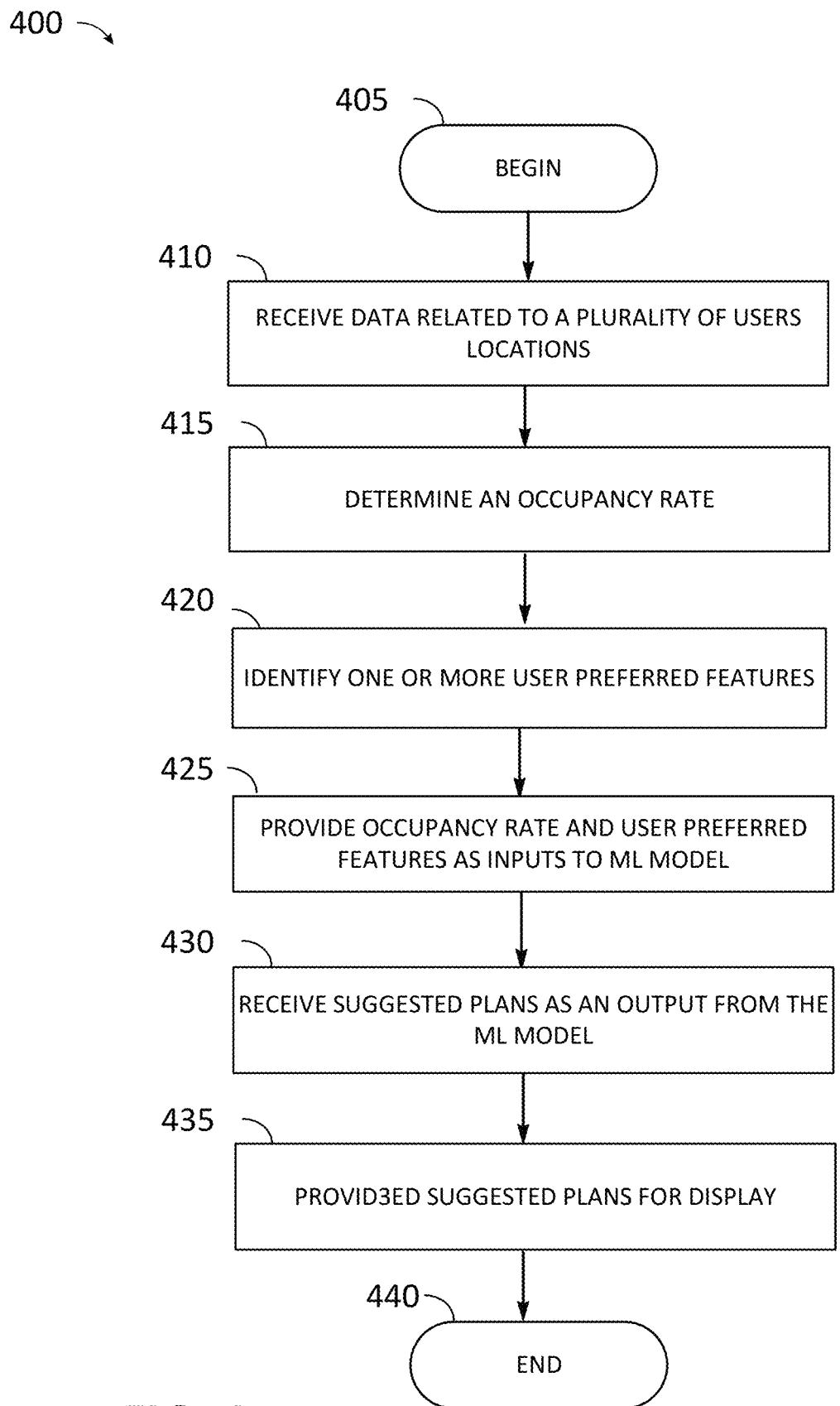
FIG. 4 is a flow diagram depicting an example method for intelligently managing and/or optimizing the use of one or more physical spaces.

FIG. 4 is a flow diagram depicting an example method 400 for intelligently managing and/or optimizing the use of one or more facilities (e.g., physical spaces). One or more steps of the method 400 may be performed by a facility management engine such as the facility management engine 114 of FIGS. 1A-1B or by an application such as applications 116/124 of FIGS. 1A-1B. The method 400 may begin, at 405, when a request to receive suggested plans for managing or optimizing a facility is received. In an example, the request may be received via an admin portal of a facility management application, when a user submits a request to receive suggestions for one or more facilities. In alternative implementations, the facility management application may run in the background to continuously and/or based on a schedule look for suggested plans for managing and/or optimizing one or more facilities.

After beginning, method 400 may proceed to receive data related to location of a plurality of users, at 410. This may occur, for example, as part of receiving user data, contextual data and/or facility data. For example, the facility data may include reservations data that points to location of one or more users at designated time. The location data may also be received from a location identifier engine and/or location identifier ML model that determines or predicts a plurality of users' locations based on received data.

Once the location data has been received, method 400 may proceed to determine an occupancy rate for one or more facilities, at 415. The occupancy rate may be calculated based on the location data of the plurality of users and/or reservation data. For example, an ML model may determine based on the reservation data and predicted location data that 65 people will be present at a facility on a given date in the future or were present at the facility at a time in the past. The occupancy rate may then be determined by comparing the total number of people expected to be present at a facility with the total number of available spaces (e.g., number of offices, desks, etc.) at the facility to calculate a percentage of occupancy for the facility.

Once the occupancy rate has been determined, method 400 may proceed to identify one or more user preferred features, at 420. The user preferred features may be determined based on the occupancy rate, by examining features that are offered at facilities that have high occupancy rates and comparing those features with features offered at facilities with low occupancy rates. Furthermore, user preferred features may be identified via explicit or implicit user feedback. For example, survey data may be collected an examined and/or user preferences may be collected from user profiles or other user history data.

After user preferred features have been identified, the occupancy rate and user preferred features may be provided as inputs to a trained ML model for determining suggestions for managing and/or optimizing the use of the one or more facilities for which occupancy rates were calculated, at 415. The trained ML model may be a model such as the facility optimization model 162 of FIG. 1B, which may utilize parameters such as facility data, occupancy data and user preferred features to identify one or more suggested plans for use of a facility.

After providing the inputs to the ML model, method 400 may proceed to receive the suggested plan as an output from the ML model, at 430. The suggested plan may include suggestions for adding or eliminating features at a facility, divesting of a facility, increasing the space of a facility or acquiring a new facility at a new location. The suggested plans may also include plans for ordering supplies, making a repair and the like. Method 400 may then provide the suggested plan for display, at 435. This may involve transmitting display data to an application. In some implementations, the display data includes information identifying the facility, providing information about the occupancy rate of the facility, identified preferred features and/or suggested plans for managing or optimizing the facility. Once, the data is provided for display, method 400 may end at 440.

Figure 5:
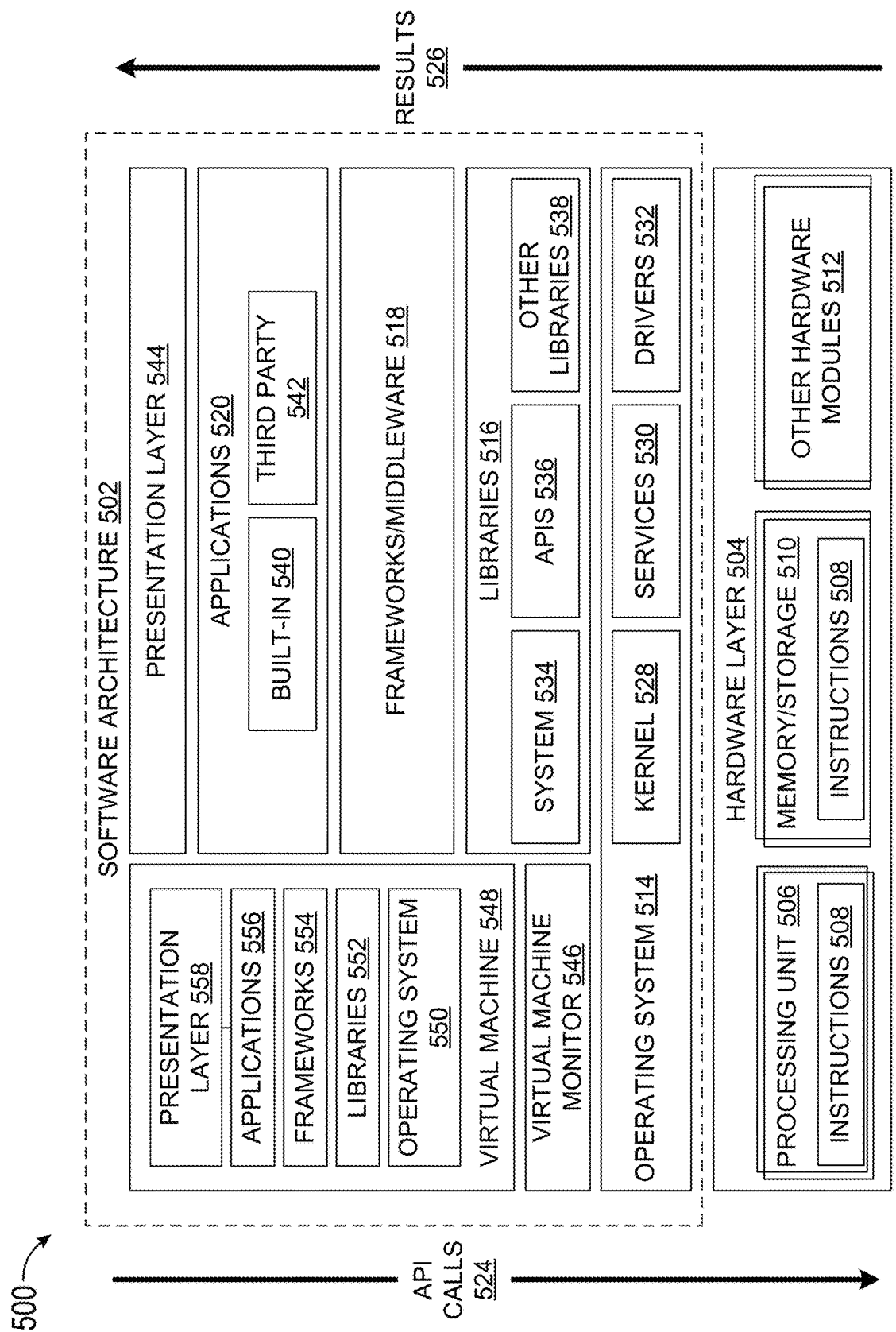
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine depicted in block diagram 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
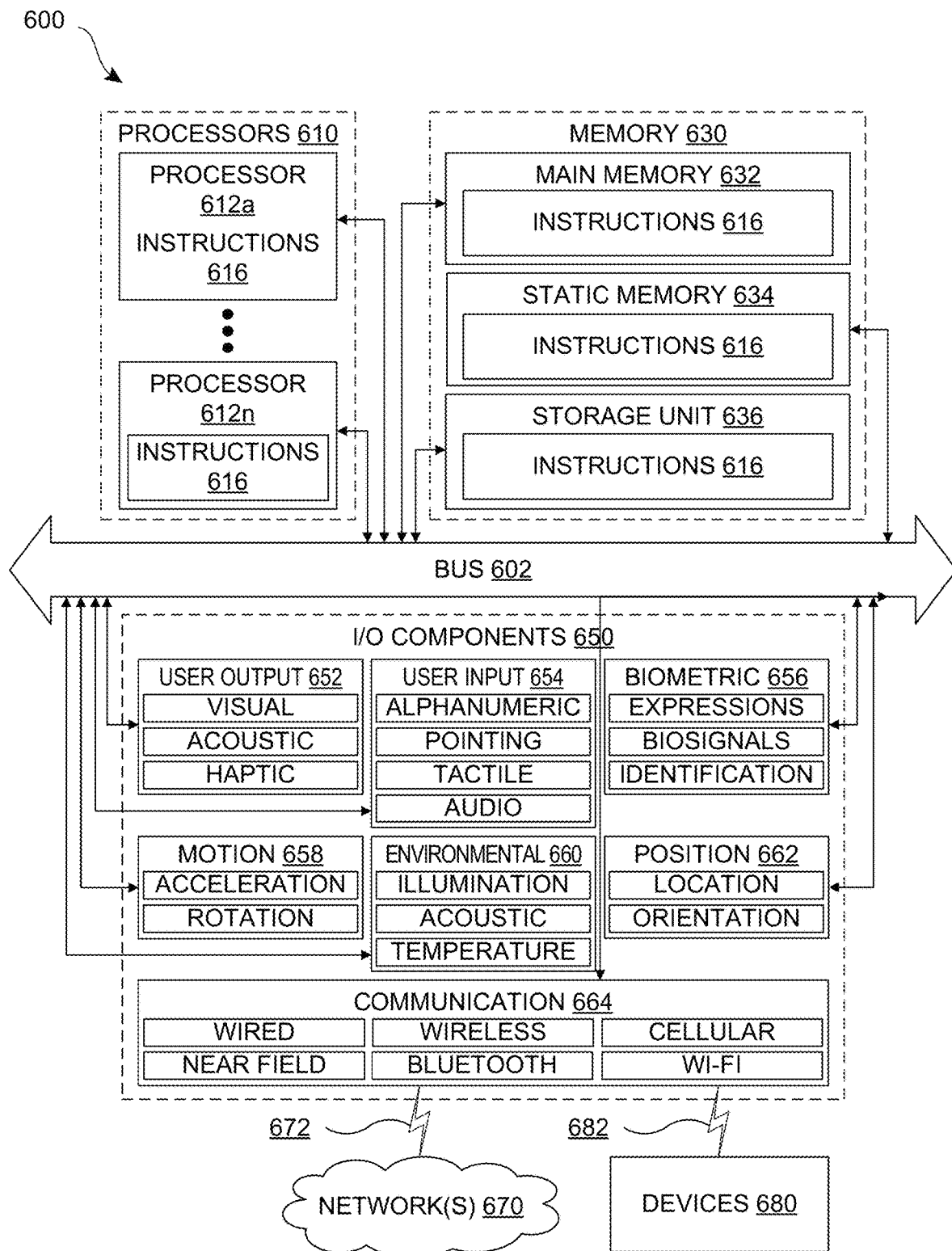
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
  a processor; and
  a memory in communication with the processor, the memory comprising executable instructions that, when executed by the processor, cause the data processing system to perform functions of:
    receiving data relating to location of a plurality of users;
    determining based on the location, an occupancy rate for one or more physical spaces;
    identifying based on the occupancy rate and features provided at the one or more physical spaces, one or more user preferred features;
    providing the occupancy rate and the user preferred features to a trained machine-learning (ML) model for determining optimal uses for the one or more physical spaces in a future time period;
    receiving as an output from the trained ML model one or more suggested plans for use or management of the one or more physical spaces in the future time period; and
    providing the suggested plans for display in a user interface (UI) screen.

Item 2. The data processing system of claim 1, wherein the location is inferred based on at least one of user data, contextual data and facility data.

Item 3. The data processing system of items 1 or 2, wherein the user preferred features include at least one of WiFi, refreshments, parking options, transportation options.

Item 4. The data processing system of any preceding item, wherein the memory comprises executable instructions that, when executed by processor, further cause the data processing system to perform functions of providing for displaying the occupancy rate of at least one of the one or more physical spaces on a UI screen associated with reserving the at least one of the one or more physical spaces.

Item 5. The data processing system of any preceding item, wherein the suggested plans include at least one of divesting of at least one of the one or more physical spaces which has an occupancy rate below a first threshold, acquiring additional physical spaces in a vicinity of the one or more physical spaces which has an occupancy rate above a second threshold, and obtaining at least one of the one or more employee preferred features for at least one of the one or more physical spaces that does not have the at least one of the one or more employee preferred features.

Item 6. The data processing system of any preceding item, wherein the memory comprises executable instructions that, when executed by processor, further cause the data processing system to perform functions of providing a survey to one or more users for rating the one or more physical spaces.

Item 7. The data processing system of any preceding item, wherein the memory comprises executable instructions that, when executed by processor, further cause the data processing system to perform functions of:
  providing a first selectable UI element for selecting one of the one or more facilities;
  providing a second selectable UI element for selecting a desired time period; and
  providing a third selectable UI element for reserving a space at the selected one of the one or more facilities for the desired time period.

Item 8. A method for managing one or more physical spaces comprising:
  receiving data relating to location of a plurality of users;
  determining based on the location, an occupancy rate for one or more physical spaces;
  identifying based on the occupancy rate and features provided at the one or more physical spaces, one or more user preferred features;
  providing the occupancy rate and the user preferred features to a trained machine-learning (ML) model for determining optimal uses for the one or more physical spaces in a future time period;
  receiving as an output from the trained ML model one or more suggested plans for use or management of the one or more physical spaces in the future time period; and
  providing the suggested plans for display in a user interface (UI) screen.

Item 9. The method of item 8, wherein the location is inferred based on at least one of user data, contextual data and facility data.

Item 10. The method of items 8 or 9, wherein the user preferred features include at least one of WiFi, refreshments, parking options, transportation options.

Item 11. The method of any of items 8-10, further comprising providing for displaying the occupancy rate of at least one of the one or more physical spaces on a UI screen associated with reserving the at least one of the one or more physical spaces.

Item 12. The method of any of items 8-11, wherein the suggested plans include at least one of divesting of at least one of the one or more physical spaces which has an occupancy rate below a first threshold, acquiring additional physical spaces in a vicinity of the one or more physical spaces which has an occupancy rate above a second threshold, and obtaining at least one of the one or more employee preferred features for at least one of the one or more physical spaces that does not have the at least one of the one or more employee preferred features.

Item 13. The method of any of items 8-12, further comprising providing a survey to one or more users for rating the one or more physical spaces.

Item 14. The method of any of items 8-13, further comprising:
  providing a first selectable UI element for selecting one of the one or more facilities;
  providing a second selectable UI element for selecting a desired time period; and
  providing a third selectable UI element for reserving a space at the selected one of the one or more facilities for the desired time period.

Item 15. A non-transitory computer readable medium on which are stored instructions that, when executed, cause a programmable device to perform functions of:
  receiving data relating to location of a plurality of users;
  determining based on the location, an occupancy rate for one or more physical spaces;
  identifying based on the occupancy rate and features provided at the one or more physical spaces, one or more user preferred features;
  providing the occupancy rate and the user preferred features to a trained machine-learning (ML) model for determining optimal uses for the one or more physical spaces in a future time period;
  receiving as an output from the trained ML model one or more suggested plans for use or management of the one or more physical spaces in the future time period; and
  providing the suggested plans for display in a user interface (UI) screen.

Item 16. The non-transitory computer readable medium of item 15, wherein the location is inferred based on at least one of user data, contextual data and facility data.

Item 17. The non-transitory computer readable medium of items 15 or 16, wherein the suggested plans include at least one of divesting of at least one of the one or more physical spaces which has an occupancy rate below a first threshold, acquiring additional physical spaces in a vicinity of the one or more physical spaces which has an occupancy rate above a second threshold, and obtaining at least one of the one or more employee preferred features for at least one of the one or more physical spaces that does not have the at least one of the one or more employee preferred features.

Item 18. The non-transitory computer readable medium of any of items 15-17, wherein the instructions when executed, further cause a programmable device to perform functions of providing for displaying the occupancy rate of at least one of the one or more physical spaces on a UI screen associated with reserving the at least one of the one or more physical spaces.

Item 19. The non-transitory computer readable medium of any of items 15-18, further comprising providing a survey to one or more users for rating the one or more physical spaces.

Item 20. The non-transitory computer readable medium of any of items 15-19, wherein the instructions when executed, further cause a programmable device to perform functions of:

providing a first selectable UI element for selecting one of the one or more facilities;
providing a second selectable UI element for selecting a desired time period; and
providing a third selectable UI element for reserving a space at the selected one of the one or more facilities for the desired time period.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a memory in communication with the processor, the memory comprising executable instructions that, when executed by the processor, cause the data processing system to perform functions of:
receiving data relating to location of a plurality of users;
determining based on the location, an occupancy rate for one or more physical spaces;
identifying based on the occupancy rate and features provided at the one or more physical spaces, one or more user preferred features;
determining, via a trained machine-learning (ML) model, optimal uses for the one or more physical spaces in a future time period, the trained ML model receiving the occupancy rate and the user preferred features as inputs and providing as an output one or more suggested plans for use or management of the one or more physical spaces in the future time period; and
providing the one or more suggested plans for display in a user interface (UI) screen,
wherein a training dataset used to train the trained ML model is updated and the updated training dataset is used to provide updated training to the trained ML model.

2. The data processing system of claim 1, wherein the location is inferred based on at least one of user data, contextual data and facility data.

3. The data processing system of claim 1, wherein the user preferred features include at least one of WiFi, refreshments, parking options, and transportation options.

4. The data processing system of claim 1, wherein the memory comprises executable instructions that, when executed by processor, further cause the data processing system to perform functions of providing for displaying the occupancy rate of at least one of the one or more physical spaces on a UI screen associated with reserving the at least one of the one or more physical spaces.

5. The data processing system of claim 1, wherein the one or more suggested plans include at least one of divesting of at least one of the one or more physical spaces which has an occupancy rate below a first threshold, acquiring additional physical spaces in a vicinity of the one or more physical spaces which has an occupancy rate above a second threshold, and obtaining at least one of the one or more employee user preferred features for at least one of the one or more physical spaces that does not have the at least one of the one or more user preferred features.

6. The data processing system of claim 1, wherein the memory comprises executable instructions that, when executed by processor, further cause the data processing system to perform functions of providing a survey to one or more users for rating the one or more physical spaces.

7. The data processing system of claim 1, wherein the memory comprises executable instructions that, when executed by processor, further cause the data processing system to perform functions of:

providing a first selectable UI element for selecting one of the one or more physical spaces;
providing a second selectable UI element for selecting a desired time period; and
providing a third selectable UI element for reserving a space at the selected one of the one or more physical spaces for the desired time period.

8. A method for managing one or more physical spaces comprising:
receiving data relating to location of a plurality of users;
determining based on the location, an occupancy rate for one or more physical spaces;
identifying based on the occupancy rate and features provided at the one or more physical spaces, one or more user preferred features;
determining, via a trained machine-learning (ML) model, optimal uses for the one or more physical spaces in a future time period, the trained ML model receiving the occupancy rate and the user preferred features as inputs and providing as an output one or more suggested plans for use or management of the one or more physical spaces in the future time period; and
providing the one or more suggested plans for display in a user interface (UI) screen,
wherein a training dataset used to train the trained ML model is updated and the updated training dataset is used to provide updated training to the trained ML model.

9. The method of claim 8, wherein the location is inferred based on at least one of user data, contextual data and facility data.

10. The method of claim 8, wherein the user preferred features include at least one of WiFi, refreshments, parking options, and transportation options.

11. The method of claim 8, further comprising providing for displaying the occupancy rate of at least one of the one or more physical spaces on a UI screen associated with reserving the at least one of the one or more physical spaces.

12. The method of claim 8, wherein the one or more suggested plans include at least one of divesting of at least one of the one or more physical spaces which has an occupancy rate below a first threshold, acquiring additional physical spaces in a vicinity of the one or more physical spaces which has an occupancy rate above a second threshold, and obtaining at least one of the one or more user preferred features for at least one of the one or more physical spaces that does not have the at least one of the one or more employee user preferred features.

13. The method of claim 8, further comprising providing a survey to one or more users for rating the one or more physical spaces.

14. The method of claim 8, further comprising:
providing a first selectable UI element for selecting one of the one or more physical spaces;
providing a second selectable UI element for selecting a desired time period; and
providing a third selectable UI element for reserving a space at the selected one of the one or more physical spaces for the desired time period.

15. A non-transitory computer readable medium on which are stored instructions that, when executed, cause a programmable device to perform functions of:
receiving data relating to location of a plurality of users;
determining based on the location, an occupancy rate for one or more physical spaces;
identifying based on the occupancy rate and features provided at the one or more physical spaces, one or more user preferred features;
determining, via a trained machine-learning (ML) model, optimal uses for the one or more physical spaces in a future time period, the trained ML model receiving the occupancy rate and the user preferred features as inputs and providing as an output one or more suggested plans for use or management of the one or more physical spaces in the future time period; and
providing the one or more suggested plans for display in a user interface (UI) screen,
wherein a training dataset used to train the trained ML model is updated and the updated training dataset is used to provide updated training to the trained ML model.

16. The non-transitory computer readable medium of claim 15, wherein the location is inferred based on at least one of user data, contextual data and facility data.

17. The non-transitory computer readable medium of claim 15, wherein the one or more suggested plans include at least one of divesting of at least one of the one or more physical spaces which has an occupancy rate below a first threshold, acquiring additional physical spaces in a vicinity of the one or more physical spaces which has an occupancy rate above a second threshold, and obtaining at least one of the one or more user preferred features for at least one of the one or more physical spaces that does not have the at least one of the one or more user preferred features.

18. The non-transitory computer readable medium of claim 15, wherein the instructions when executed, further cause a programmable device to perform functions of providing for displaying the occupancy rate of at least one of the one or more physical spaces on a UI screen associated with reserving the at least one of the one or more physical spaces.

19. The non-transitory computer readable medium of claim 15, further comprising providing a survey to one or more users for rating the one or more physical spaces.

20. The non-transitory computer readable medium of claim 15, wherein the instructions when executed, further cause a programmable device to perform functions of:
providing a first selectable UI element for selecting one of the one or more physical spaces;
providing a second selectable UI element for selecting a desired time period; and
providing a third selectable UI element for reserving a space at the selected one of the one or more physical spaces for the desired time period.

* * * * *